INVENTOR.
HOWARD WARNOCK
BY Toulmin & Toulmin
ATTORNEYS

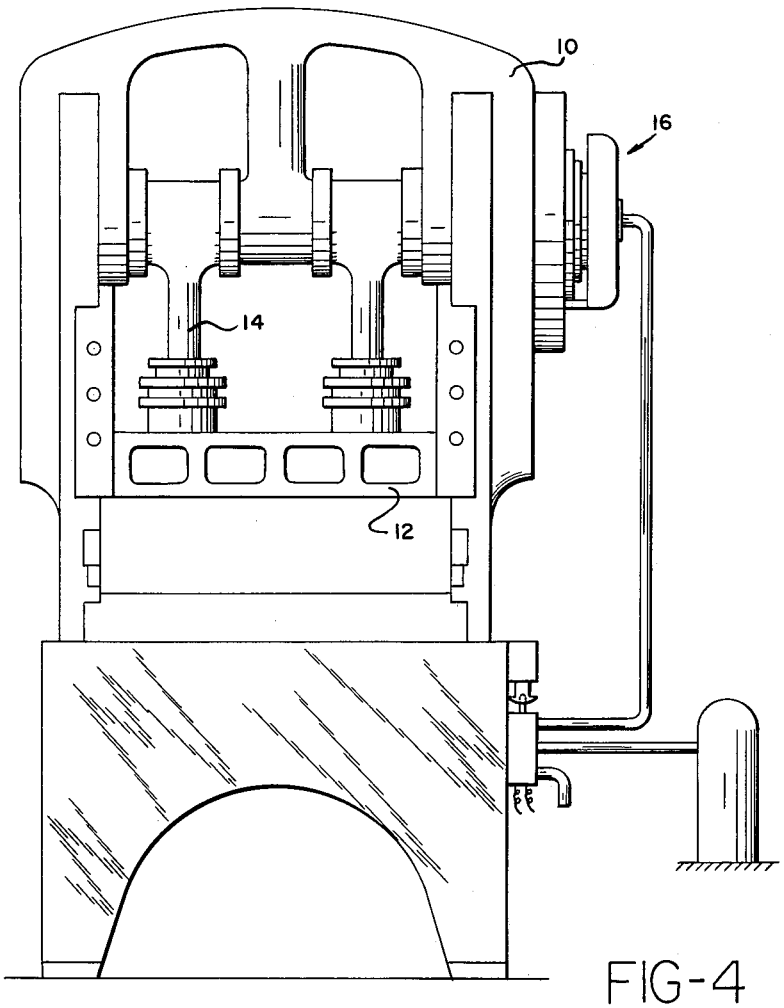
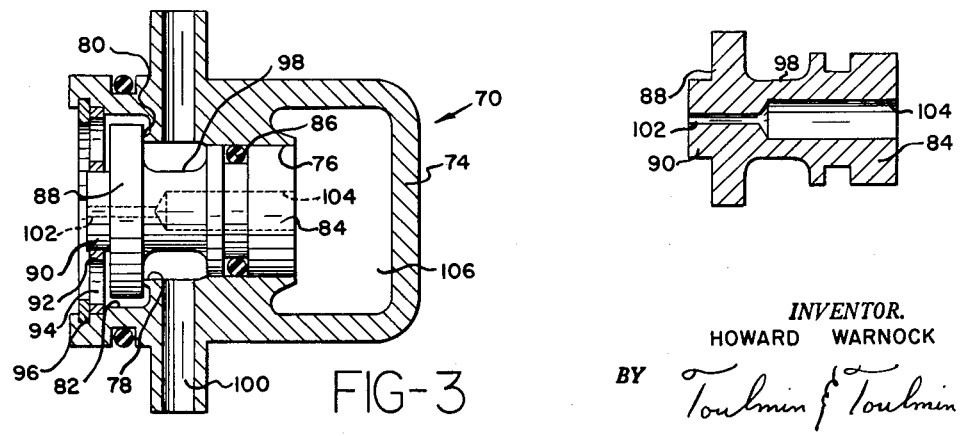

United States Patent Office 3,039,440
Patented June 19, 1962

3,039,440
VALVE FOR PRESS CLUTCH
Howard B. Warnock, Minster, Ohio, assignor to The Minster Machine Company, Minster, Ohio, a corporation of Ohio
Filed Feb. 23, 1961, Ser. No. 91,091
10 Claims. (Cl. 121—38)

This invention relates to the control of pneumatically operated devices and to special valve structures for effecting the said control. The present invention relates particularly to the control of pneumatically operated clutch units for mechanical presses and the like but is not strictly limited thereto.

In connection with mechanical presses and like units, a great many employ combination clutch and brake devices for selectively clutching a drive motor to the machine for a work operation and for then unclutching the motor from the machine while simultaneously braking the machine to a halt prior to commencing a new work operation.

With faster operating speeds being required, it is becoming more and more important to cycle machines of this nature more rapidly and which more rapid cycling, of course, involves more rapid cycling of the combination clutch and brake unit. Particularly with automated production lines having presses and brakes therein, such rapid cycling of the combination clutch and brake unit is important because the machine must come to a complete halt before the automatic loading and unloading devices operate and the more rapidly the clutch and brake unit cycle, the more rapid the overall cycle of the machine.

Normally, in connection with pneumatically operated units of the combination of a clutch and brake unit, the speed of response of the unit when compressed air is supplied thereto is rapid enough and can be made even more rapid by increasing the pressure of the air supplied thereto. Upon exhausting the air from the unit, however, a different condition exists because high pressure for moving the air exists only at the beginning of the exhausting thereof with the pressure falling as the air is progressively exhausted.

Still further, there is usually a relatively long pipe or conduit leading to the unit through which the air is supplied to the unit and exhausted therefrom and this long pipe or conduit is influential in introducing operating delays, particularly, in connection with the exhausting of air from the unit.

Having the foregoing in mind, it is a primary object of the present invention to provide an arrangement whereby the cycling rate of pneumatically operated devices can be substantially increased.

Still another object of this invention is the provision of a relatively simple valve arrangement which will greatly increase the rate to which a pneumatically operated device can be exhausted.

Still another object of this invention is the provision of a relatively inexpensive valve arrangement for accomplishing the rapid release of pressure fluid from a pneumatically operated device which can be incorporated in existing manufacture as well as new manufacture.

Still another object of this invention is the provision of a quick release valve for a pneumatically operated device which is relatively fail-safe and which involves the minimum number of moving parts.

These and other objects and advantages of this invention will become more apparent upon reference to the following specification taken in connection with the accompanying drawings in which:

FIGURE 1 is a more or less diagrammatic view of a typical pneumatically controlled machine adapted for having the valve arrangement of the present invention incorporated therein, the particular machine illustrated being a mechanical press;

FIGURE 3 is a longitudinal section through the valve of the present invention drawn at enlarged scale.

FIGURE 4 is a cross sectional view of the valve member shown in FIGURE 3.

Figure 2:
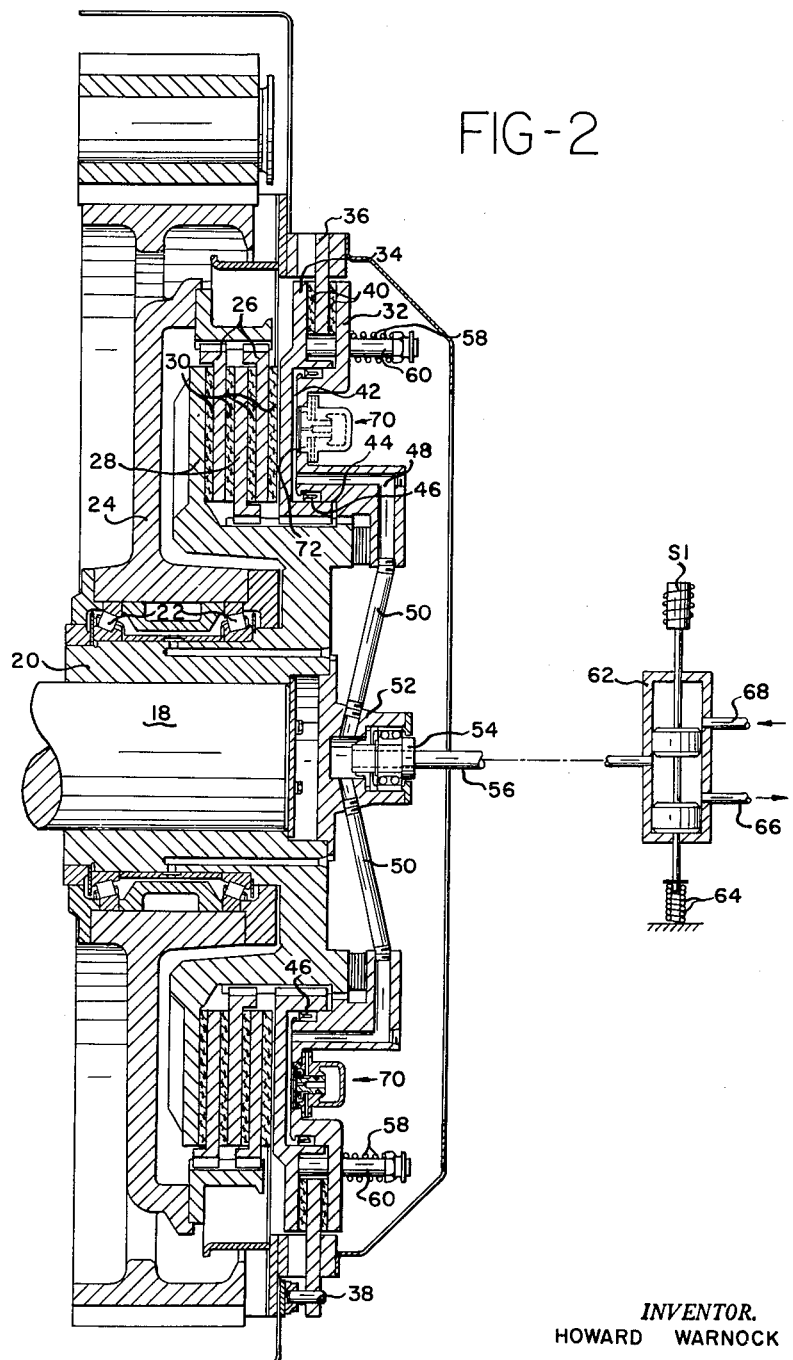
FIGURE 2 is a vertical section through the combination clutch and brake unit of the press showing the relation of the quick exhaust or quick release valve of the present invention to the pneumatic components of the said unit.

Referring to the drawings somewhat more in detail, in FIGURE 1 there is shown a press having a frame 10 in which is reciprocably mounted a platen 12. Platen 12 is adapted for being actuated by connecting rod means 14 leading from a crankshaft journaled in frame 10. On at least one end of the crankshaft, there is a clutch brake unit 16 which is operable for selectively clutching a drive motor M to the crankshaft for driving the crankshaft in rotation, or for braking the crankshaft to the press frame to halt the crankshaft and to hold it stationary.

The construction of the clutch brake unit is substantially conventional and is illustrated in section in FIGURE 2. In FIGURE 2, the crankshaft is indicated at 18 and fixed thereon is a hub member 20 which rotatably supports, by anti-friction bearings 22, a large flywheel or drive gear 24. Where member 24 is a flywheel, it is usually belted to the drive motor and where it takes the form of a gear, a gear train leads from member 24 to the drive motor. In any case, member 24 is continuously driven in rotation.

Member 24 has connected therewith a plurality of clutch plates 26 which interleave with clutch plates 28 that are fixed to hub member 20. Friction material 30 is disposed between the clutch plates for effecting frictional drive connection therebetween when the clutch is actuated thereby drivingly to connect flywheel member 24 with hub 20 and therethrough with crankshaft 18.

Hub 20 also carries a brake plate 32 and a combination brake-clutch plate 34. Disposed between plates 32 and 34 is a stationary brake plate 36 that is held against rotation by a pin 38. Friction material 40 is disposed between plates 36 and the plates 32 and 34 on opposite sides thereof so that when the plates 32 and 34 are pressed against plate 36, they will be frictionally engaged therewith and this will hold plates 32 and 34 and the hub 20 connected therewith and the crankshaft 18 attached to the hub against rotation.

It will be seen that the several plates referred to are splined to their respective supporting members so that a certain amount of axial movement of the plates relative to each other can be had for bringing the plates into and out of engagement with each other.

The aforementioned plate 34 is formed with an annular cylinder cavity 42 and plate 32 is formed with a piston portion 44 extending into the cylinder cavity. Sealing means 46 mounted on the piston portion seals between the piston portion and the cylinder cavity. A passage 48 formed at plate 32 leads from the cylinder cavity to a conduit 50 which, in turn, leads downwardly to a member 52 that is attached to hub member 20 so as to rotate therewith.

A rotary air distributor 54 connected to member 52 on the axis thereof provides means for effecting communication between a supply conduit 56 for compressed air and conduit 50 so that by controlling the supply of compressed air to conduit 56, the supply of compressed air to the cylinder cavity can also be controlled.

With respect to the supply of air to the cylinder cavity, when this cavity is pressurized, plates 32 and 36 are pressed apart to release brake plate 36 from therebetween while simultaneously, the plate 34 is pressed toward the stationary innermost clutch plate 28 whereby drivingly to connect clutch plate 26 and 28 and thereby drivingly to connect flywheel 24 with hub 20 and crankshaft 18.

When the cylinder cavity 42 is relieved of air pressure, springs 58 bearing between the outer face of plate 32 and the underside of a nut mounted on a stud 60 connected to plate 34 and extending through plate 32, draw plates 32 and 34 together into braking engagement with plate 36 while simultaneously releasing the clutch plates.

The supply of compressed air to conduit 56 is under the control of a three-way valve 62 normally biased by a spring 64 into position to connect conduit 56 with exhaust conduit 66. Energization of a solenoid operator S1 associated with the valve will cause shifting of the valve to disconnect conduit 56 from exhaust conduit 66 and to connect it, instead, to pressure conduit 68.

It is in particular connection with the exhausting of compressed air from the cylinder cavity that the present invention is concerned. The exhausting of the cylinder cavity according to the present invention involves a novel quick release valve indicated at 70 in FIGURE 2 and shown at enlarged scale in FIGURE 3.

This valve is mounted in plate 32 in a bore 72 provided therein so that the inner end of the valve 70 communicates directly with the cylinder cavity 42. In many instances, only one of the valves is required, but it will be understood that there could be a plurality of these valves employed if so desired without, in any way, changing the manner in which the system operates.

Turning now to the construction of valve 70, it will be seen to comprise a body part 74 formed with a bore 76 that has a slightly enlarged portion 78 at the end of the valve body facing the cylinder cavity. This enlarged portion terminates in an annular valve seat 80 and this valve seat is formed at the bottom of a shouldered cavity 82 which is substantially larger than portion 78 of the valve bore.

Reciprocably mounted in the valve bore 76 is a valve member 84 having a portion closely slidably fitting portion 76 of the valve bore and sealed therein by the resilient O-ring 86.

The valve member also comprises an enlarged disc-like portion 88 at the cylinder cavity end of the valve which extends radially outwardly beyond valve seat 80 so as to engage the valve seat in sealing relation. This disc-like portion is diametrally smaller than cavity 82 to permit the movement of fluid through the cavity and around the disc-like portion.

Extending outwardly from disc-like portion 88 is a relatively short hub 90 fitting the central aperture of a guide member 92 which has other apertures 94 circumferentially spaced thereabout and which is retained in the mouth of cavity 82 by a snap ring 96. Guide member 92 supports and guides the valve member and limits the amount of movement thereof away from valve seat 80 while apertures 94 in the guide member provide for passage of air through the guide member and around the disc-like portion 88 of the valve member.

Between the disc-like portion 88 and the portion of the valve member that fits in bore 76, there is an annular recess 98 formed in the valve member that forms a cavity that communicates with exhaust passages 100 in body 74 of the valve.

The valve member is also provided with a relatively small metering orifice 102 that connects the end of the valve member that is toward the cylinder cavity with a larger bore 104 leading into the trap chamber 106 located at the end of valve body 74 that is opposite the cylinder cavity end thereof.

At this point, it will be noted that the area of the valve member that is exposed to fluid in the trap chamber 106 is smaller than the area of the valve member that is exposed to fluid in the cylinder cavity. When the cylinder cavity is pressurized, the valve member is thus urged rightwardly toward valve seat 80 and will engage and seal against the valve seat and thus prevent the loss of pressure from the cylinder cavity.

It will also be evident that the pressure standing within the cylinder cavity will pass through orifice 102 and bore 104 into the trap chamber 106 until the pressure in the trap chamber is equal to that in the cylinder cavity. The valve member, however, will remain seated on the valve seat on account of the aforementioned differential areas.

Upon exhausting of the cylinder cavity by the shifting of the valve member of valve 62 to connect conduit 56 with exhaust conduit 66, there will be an extremely rapid release of pressure from the cylinder cavity on account of the quick release valve. This comes about because the said shifting of the valve member of valve 62 will produce an initial drop in pressure in the cylinder cavity such that the pressure fluid in trap chamber 106 will overbalance valve member 84 and cause it to shift leftwardly away from valve seat 80 thereupon providing for a relatively unrestricted passage from the cylinder cavity to the atmosphere and which will lead to extremely rapid exhausting of the air from the cylinder cavity which will be accompanied by rapid releasing of the clutch and rapid closing of the brake.

The speed of operation of the quick release valve of the present invention is determined by the pressure of the air supplied to the cylinder cavity and the particular size of the metering orifice which controls the decay of pressure in trap chamber 106.

It will be evident that the use of the quick release valve eliminates the delay that would be encountered in exhausting the compressed air from the cylinder cavity through the long conduit means leading thereto from the valve 62 and that the unit can therefore operate much more rapidly by incorporating the valve of the present invention therein.

The use of the valve of the present invention, however, involves no redesigning of the machine and it can be employed in existing equipment without any change in the piping or the control system. The valve employs the pressure that is used for engaging the clutch both for opening and closing the valve and thus no separate operating controls are required.

The valve is subject to considerable modification as to size of the trap chamber and the metering orifice and the like in order to obtain exactly the right amount of delay, if such should be desired in the operating circuit, without requiring any other change in the press or clutch and brake unit or the control system.

The valve is so constructed, having opposed areas on the valve member, that the valve can be used with extremely high pressures without any part of the valve that might be subject to wear becoming overloaded.

The valve seat is of such a nature that as wear occurs, the pressure differential pertaining to the valve member will become greater, thereby increasing the closing force.

An important feature that develops from the use of the valve of this invention is that, the valve provides an inherent fail-safe feature in that the total opening force on the valve member is greater than the sealing force so that if the valve fails, it will fail in the open position and this will provide a free passage from the exhaust to the cylinder cavity so that the clutch will not operate because sufficient pressure will not be built up therein.

It will be understood that this invention is susceptible to modification in order to adapt it to different usages and conditions; and, accordingly, it is desired to comprehend such modifications within this invention as may fall within the scope of the appended claims.

I claim:

1. In a fluid operated valve; a valve body having a pressure inlet port and an exhaust port, a valve member freely movable in said valve body between a first position wherein communication between said ports is interrupted and a second position wherein communication between said ports is established, a first fluid operable area on said valve member connected with said inlet and responsive to pressure and forming the sole means for urging said valve member toward said first position, a second and smaller fluid operable area on said valve member arranged in opposition to said first fluid operable area and forming the sole means for urging said valve member toward said second position, a closed chamber in the valve body in which said second fluid operable area is disposed, and a restricted passage connecting said chamber with said inlet.

2. In a fluid operated valve; a valve body having a pressure inlet port and an exhaust port, a valve member freely movable in said valve body between a first position wherein communication between said ports is interrupted and a second position wherein communication between said ports is established, a first fluid operable area on said valve member connected with said inlet and responsive to pressure and forming the sole means for urging said valve member toward said first position, a second and smaller fluid operable area on said valve member arranged in opposition to said first fluid operable area and forming the sole means for urging said valve member toward said second position, a closed chamber in the valve body in which said second fluid operable area is disposed, and a restricted passage connecting said chamber with said inlet, said restricted passage being formed in said valve member.

3. In a fluid operated valve; a valve body having a pressure inlet port and an exhaust port, a valve member freely movable in said valve body having a first position wherein communication between said ports is interrupted and a second position wherein communication between said ports is established, a first fluid operable area on said valve member connected with said inlet and responsive to pressure and forming the sole means for urging said valve member toward said first position, a second and smaller fluid operable area on said valve member arranged in opposition to said first fluid operable area and forming the sole means for urging said valve member toward said second position, a closed chamber in the valve body in which said second fluid operable area is disposed, and a restricted passage connecting said chamber with said inlet, said restricted passage being formed in said valve member, said inlet port being directly in the end of said valve body opposite said chamber and being as large as said valve member and said first fluid operable area being directly exposed to said inlet port.

4. In a fluid operated valve; a valve body having a bore extending partway therethrough from one end, the mouth of said bore being counterbored and a valve seat larger in diameter than said bore at the bottom of the counterbore, a valve member having a first part slidably fitting said bore and confining a closed chamber with said bore and having a second and larger part in said counterbore engageable with said valve seat, exhaust port means in the valve body leading from said bore adjacent said valve seat, said valve member being freely slidable in said valve body, there being relief in at least one of said valve member and bore to provide free communication between the exhaust port means and said counterbore when the valve member moves to lift the said second part thereof off said seat, a passage comprising a metering orifice leading axially through said valve member to connect the bottom of said bore with the opposite end of the valve member, and said valve body comprising means for mounting the valve with the counterbored end of the bore in communication with a space which is alternately pressurized and exhausted, the areas of said valve member exposed to said chamber and to said space forming the sole means for moving said valve member between its operative positions.

5. In a fluid operated valve; a valve body having a bore extending partway therethrough from one end, the mouth of said bore being counterbored and a valve seat larger in diameter than said bore at the bottom of the counterbore, a valve member having a first part slidably fitting said bore and confining a closed chamber with said bore and having a second and larger part in said counterbore engageable with said valve seat, exhaust port means in the valve body leading from said bore adjacent said valve seat, there being relief in at least one of said valve member and bore to provide free communication between the exhaust port means and said counterbore when the valve member moves to lift the said second part thereof off said seat, a passage comprising a metering orifice leading axially through said valve member to connect the bottom of said bore with the opposite end of the valve member, and said valve body comprising means for mounting the valve with the counterbored end of the bore in communication with a space which is alternately pressurized and exhausted, there being an apertured stop plate in the outer end of the counterbore to stop the valve member in its opening direction of movement, the areas of said valve member exposed to said chamber and to said space forming the sole means for causing movement of said valve member in said valve body.

6. In a system for an elastic fluid medium; an enclosure which is alternately pressurized and exhausted, a conduit leading from said enclosure and valve means in the conduit remote from the enclosure for controlling the supply of fluid to and the exhausting of fluid from the conduit, and valve means associated with said enclosure separately from said conduit for effecting the rapid release of fluid therefrom comprising a valve body having a bore with one end opening directly into said enclosure, exhaust port means in the valve body, a valve member in the valve body moveable therein between a first position wherein communication between said one end of the bore and said exhaust port means is interrupted and a second position wherein said communication is established, said valve member having a larger end at the said one end of the bore exposed to the pressure in said enclosure responsive to fluid pressure and forming the sole means to urge the valve member toward said first position, said valve member comprising a smaller end at the other end of the bore, said smaller end being responsive to pressure and forming the sole means to urge said valve member toward said second position, said other end of the bore being closed to define a trap chamber, and a restricted passage extending axially through said valve member for the controlled exchange of fluid between said enclosure and trap chamber.

7. In a system for an elastic fluid medium; an enclosure which is alternately pressurized and exhausted, a conduit leading from said enclosure and valve means in the conduit remote from the enclosure for controlling the supply of fluid to and the exhausting of fluid from the conduit, and valve means associated with said enclosure separately from said conduit for effecting the rapid release of fluid therefrom comprising a valve body having a bore with one end opening directly into said enclosure, exhaust port means in the valve body, a valve member in the valve body moveable therein between a first position wherein communication between said one end of the bore and said exhaust port means is interrupted and a second position wherein said communication is established, said valve member having a larger end at the said one end of the bore exposed to the pressure in said enclosure responsive to fluid pressure and forming the sole means to urge the valve member toward said first position, said valve member comprising a smaller end at the other end of the bore also responsive to fluid pressure and forming the sole means to urge said valve member toward said second position, said other end of the bore being closed to define a trap chamber, and a restricted passage extending axially through said valve member for the controlled exchange of pressure fluid between said enclosure and trap chamber, said enclosure having a wall, said wall having an aperture, and said valve body being sealingly mounted in said aperture.

8. In an air operated clutch unit for a press or the like wherein the unit rotates during at least part of the time and comprises a cylinder adapted for energizing the clutch when pressurized and for releasing the clutch when exhausted, and wherein the control of the pressure in the cylinder includes conduit means leading from a remote control point to the cylinder by way of the axis of rotation of the unit; a valve entirely independent of said conduit means and operable for effecting exhaust of the cylinder directly to the atmosphere, said valve having a valve body mounted in a wall of the cylinder, said valve body having a bore communicating with said cylinder at one end and with the atmosphere at the other end, a valve member in the valve body controlling said bore, a first area on said valve member directly exposed to the cylinder and responsive to pressure in said cylinder and forming the sole means for urging said valve member in a direction to close said bore, a second and smaller area on said valve member also responsive to fluid pressure and forming the sole means for urging said valve member in a direction to open said bore, a closed trap chamber in which said second area is disposed, and a restricted passage in said valve member connecting said trap chamber with said cylinder.

9. In an air operated rotary unit which includes an enclosure adapted for being alternately placed under air pressure and exhausted to the atmosphere, a conduit leading to the said enclosure on the axis of rotation thereof including a rotary joint so that the conduit remains stationary while the unit rotates, a control valve in the conduit remote from the enclosure for supplying air under pressure to the enclosure or for connecting the enclosure to exhaust, and a quick exhaust valve mounted in a wall of said chamber independently of said conduit, said exhaust valve having a valve body with a passage therein communicating at one end directly with said enclosure and with the atmosphere at the other end, a valve member in the valve body controlling said passage, a first fluid operable area on said valve member operable for moving the valve member in a direction to interrupt said passage and forming the sole means for so moving said valve member, a second and smaller fluid operable area on said valve member responsive to fluid pressure for moving the valve member in a direction to open said passage and forming the sole means for so moving said valve member, a closed trap chamber in the valve body in which said second fluid operable area is disposed, an unrestricted connection leading from said first area to said chamber, and a restricted connection leading from said trap chamber to the first mentioned said chamber.

10. In an air operated rotary unit which includes an enclosure adapted for being alternately placed under air pressure and exhausted to the atmosphere, a conduit leading to the said enclosure on the axis of rotation thereof including a rotary joint so that the conduit remains stationary while the unit rotates, a control valve in the conduit remote from the enclosure for supplying air under pressure to the enclosure or for connecting the enclosure to exhaust, and a quick exhaust valve mounted in a wall of said enclosure and entirely independent of said conduit, said exhaust valve having a valve body with a passage therein communicating at one end directly with said enclosure and with the atmosphere at the other end, a valve member in the valve body controlling said passage, a first fluid operable area on said valve member operable for moving the valve member in a direction to interrupt said passage and forming the sole means for so moving the valve member, a second and smaller fluid operable area on said valve member responsive to fluid pressure for moving the valve member in a direction to open said passage and forming the sole means for so moving said valve member, a closed trap chamber in the valve body in which said second fluid operable area is disposed, an unrestricted connection leading from said first area to said enclosure, and a restricted connection leading from said trap chamber to said enclosure, said restricted passage being of a size small enough that when the control valve is shifted to connect the conduit with exhaust, the pressure in the first mentioned said enclosure will decay more rapidly than the pressure in said trap chamber.

References Cited in the file of this patent
UNITED STATES PATENTS

| | | |
|---|---|---|
| 2,882,865 | Onsrud | Apr. 21, 1959 |
| 2,954,010 | Bass et al. | Sept. 27, 1960 |

FOREIGN PATENTS

| | | |
|---|---|---|
| 314,103 | Switzerland | May 31, 1956 |